M. L. ROOD.
Velocipede.
No. 94,842. 
Patented Sept. 14, 1869.
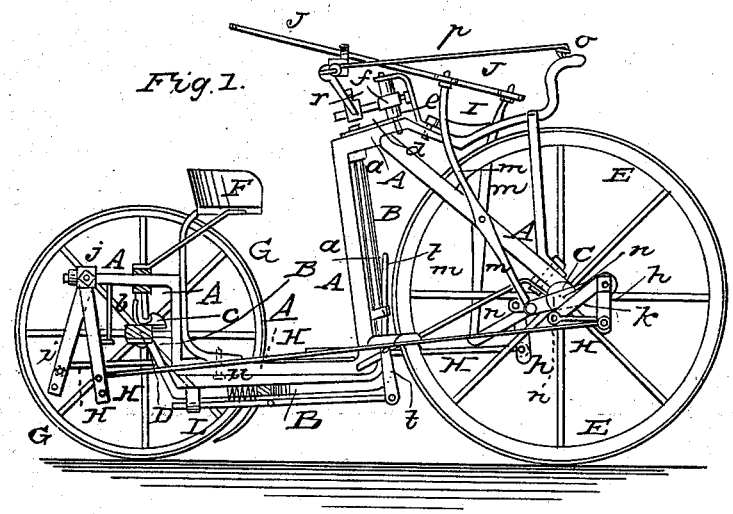
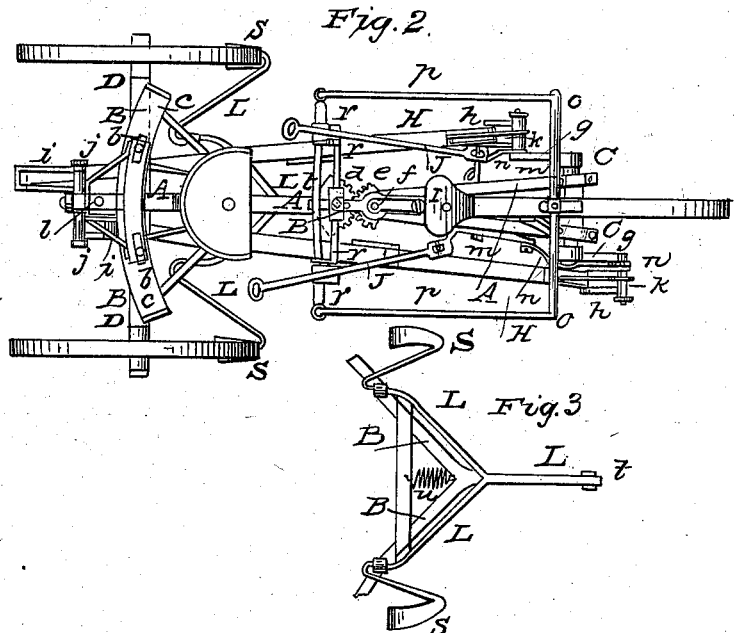
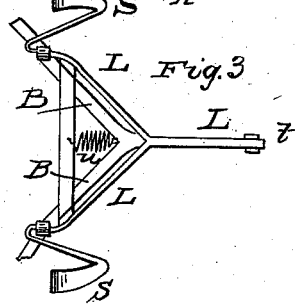

United States Patent Office.

M. L. ROOD, OF DENVER, COLORADO TERRITORY.

Letters Patent No. 94,842, dated September 14, 1869.

IMPROVED VELOCIPEDE.

The Schedule referred to in these Letters Patent and making part of the same.

*To all whom it may concern:*

Be it known that I, M. L. ROOD, of Denver, in the county of Arapahoe, and Territory of Colorado, have invented a new and improved Velocipede; and I do hereby declare that the following is a full, clear, and exact description thereof, which will enable others skilled in the art to make and use the same, reference being had to the accompanying drawings, forming part of this specification, in which—

Figure 1 represents a side elevation, partly in section, of my improved velocipede.

Figure 2 is a plan or top view of the same.

Figure 3 is a detail inverted plan view, showing the brake attachment.

Similar letters of reference indicate corresponding parts.

This invention relates to a new three-wheeled velocipede, which is so constructed that it can be propelled by a convenient motion of the feet or hands, readily steered and stopped, and that it will accommodate two riders at once.

The invention consists, first, in a novel construction of jointed reach; secondly, in a new form and arrangement of brake, and also in a novel combination and arrangement of propelling-mechanism.

A, in the drawing, represents the front part of the frame of my improved velocipede.

B is the back part of the frame. The front part extends up from the front axle C, and then down and back, and reaches over the rear axle D. The rear part extends forward from the rear axle, and is close behind the front wheel E, turned up, and has the vertical arm $a$, thus formed, fitted through the upper part of the frame A, and pivoted therein.

The rear part of the frame A rests on rollers $b\ b$, which travel on a segmental plate, $c$, that is secured upon the rear axle, as shown.

On the upper end of the pin $a$ is mounted a toothed segment or wheel, $d$, which meshes into a similar wheel or segment, $e$, which is mounted on a vertical pin, $f$. This pin is swivelled in the frame A, and is provided with a steering-handle, $r$, so that by turning said handle, the two parts of the frame will be swung to steer.

The main seat F is supported on the frame A. When steered, the front frame will swing with the front wheel, and the driver's seat will therefore always be in the same direction in which the vehicle is progressing.

The rear axle carries two wheels, G G, which are merely following-wheels, while the front wheel E is the driving and steering-wheel.

On its shaft C are cranks $g$, from which stirrups $h$ are suspended. These stirrups are, by means of long rods H, connected with stirrups $i$, which are suspended from a transverse pin, $j$, that is fitted through the rear end of the frame A, as shown.

On the rods H are pivoted hooks $k$, which can, as in fig. 1, be locked to the crank-pins, in which case the stirrups $h$ will be locked at right angles to the rods H.

The driver on the seat F may, by means of the feet, alternately depress one of the rods H, and thereby rotate the wheel E, or the hooks $k$ may be uncoupled from the cranks, when the wheel may also be revolved by oscillating the rods H. In this case, however, these rods must be locked together at their rear ends by a pin, $l$, fitted through their stirrups, $i$. The device may also be propelled by holding the feet directly upon the cranks $g$, for which purpose another seat, I, is secured upon the upper front part of the frame A. The device may also be propelled by hand, by means of handles J, which are, by means of levers $m$ and rods $n$, connected with the cranks. The person on the front seat may also aid in steering by working a front steering-handle, $o$, which is by rods $p\ p$ connected with the ends of the handle $r$.

The brake is in form of a Y-shaped frame, L, shown in fig. 3, with shoes $s\ s$ at its ends. Its front shank is pivoted to a lever, $t$, which is pivoted to the front upright $a$ of the rear frame B. A spring, $u$, serves to draw the shoes of the rear wheels. By swinging the upper end of the lever $t$ forward, the rider on the seat F can at any time apply the brake with one foot.

Having thus described my invention,

What I claim as new, and desire to secure by Letters Patent, is—

1. The frame A B, made of two parts, the front part having its rear end supported on the segmental plate $c$ of the rear part, while the front upright arm $a$ of the rear piece, connects the two parts, substantially as herein shown and described.

2. The arrangement of the jointed frame and steering-device, with respect to the driving-mechanism, in the manner and for the purpose specified.

3. The brake, consisting of the Y-shaped frame L, operated by a lever, $t$, and arranged substantially as herein shown and described.

4. The combination of the rods H, stirrups $h\ i$, cranks $g$, and shaft C, with the handles J, levers $m$, and rods $n$, all connected to form the propelling-mechanism, substantially as herein shown and described.

M. L. ROOD.

Witnesses:
JOHN D. ROBY,
WM. B. DAVIDS.